Patented Apr. 10, 1951

2,548,701

UNITED STATES PATENT OFFICE 2,548,701

CLARIFICATION OF SPARKLING WINES

Hector R. Carveth, Jr., Lewiston, N. Y., assignor to Chateau Gay Ltd., Lewiston, N. Y.

No Drawing. Application March 14, 1947, Serial No. 734,855

2 Claims. (Cl. 99—48)

The present invention relates to the manufacture of sparkling wines in accordance with the approved procedure of fermenting the wine in the bottle in which it is to be ultimately distributed. The invention relates more particularly to the clarification of sparkling wines, such as champagne.

In both the United States of America and in France champagne is the resultant wine produced when a selected white, low, dry, still wine is sugared, re-yeasted, and allowed to ferment secondarily in the bottle in which it is ultimately sold. The secondary fermentation of the added sugar produces carbon dioxide, generating gaseous pressure within the bottle, the presence of carbon dioxide gas under pressure producing the desired effervescence of sparkle when the bottle is opened.

After the secondary fermentation has occurred, which fermentation usually requires from two to eight weeks for its completion, the wine is placed in tierage and permitted to age for as long a period as the individual manufacturer deems necessary. After the wine has aged for the requisite period the bottles are placed on racks or pupitries with their necks down for the purpose of permitting the dead yeast cells, cream of tartar, albumin, and other extraneous material, to settle on the cork stoppers. To facilitate this settling of sediment, the bottles are turned by a skilled manipulator at least once a day for a period of two to eight weeks, at which time sedimentation, with resultant clarification, is complete. The cork and sediment are removed, the bottles restoppered, and placed on the market.

It is an object of the present invention to clarify sparkling wines, such as champagnes, in a very short period of time and eliminate the laborious turning of the champagne bottles required in the conventional clearing thereof.

In accordance with the present invention a sparkling wine such as champagne can be clarified in the bottle in which it is to be ultimately distributed in a period of a few minutes. This clarification is performed after the usual secondary fermentation in the bottle by inserting the bottle, neck down, in a centrifuge and centrifuging for a period of a few minutes to about ten minutes at a speed of 650 to 750 R. M. P. on a three foot radius.

After the bottles have been centrifuged the wine is perfectly clear; sediment will be found attached and relatively compacted upon the stopper of the bottle which may be of the usual cork stopper type or cork-lined crown type.

As the secondary fermentation produces gas pressures within the bottle in the neighborhood of ninety pounds per square inch at 68° F., the centrifuged bottles are removed from the centrifugal apparatus, neck down, and the necks of the bottles are placed in a brine solution the temperature of which is sufficiently low to form a sludge of ice crystals through and above the sediment produced by the centrifuging action to which the bottles had been previously subjected. In general, the brine solution should be cooled to a temperature in the neighborhood of about 10° F.

After the plug of ice has formed in the neck of the bottle, it is removed from the brine solution, the stopper removed, and the ice plug and sediment blown out. The bottle is then dosed in conventional fashion with an especially prepared wine, or liqueur, or both and, if necessary, replenished with additional champagne, recorked, and wired for distribution.

The sparkling wine prepared in accordance with the present invention was perfectly clear, showed no sediment on standing, and possessed all of the aperient properties of champagne produced by the approved method of secondary fermentation within the bottle in which the wine is to be distributed.

What is claimed is:

1. A process of clarifying sparkling wines which comprises performing the secondary fermentation within the bottle in which the wine is to be distributed, thereafter subjecting the bottle and contents to centrifugation to collect the sediment against the stopper thereof, freezing the wine in the neck of the bottle and subsequently removing the ice and sediment and restoppering said bottle.

2. The step in the process of producing sparkling wines in the bottle in which said wine is to be distributed, which comprises subjecting the bottle and contents to centrifugation whereby any sediment therein collects upon the stopper of said bottle.

HECTOR R. CARVETH, JR.

REFERENCES CITED

The following references are of record in the file of this patent:

UNITED STATES PATENTS

| Number | Name | Date |
|---|---|---|
| 330,780 | Frederiksen et al. | Nov. 17, 1885 |
| 485,248 | Wolford | Nov. 1, 1892 |
| 523,351 | Hugershoff | July 24, 1894 |
| 737,634 | Kiefer | Sept. 1, 1903 |

OTHER REFERENCES

"Industrial and Engineering Chemistry," vol. 27, No. 11, November 1935, pages 1235 to 1244.

"Chemistry and Technology of Wines and Liquors," by K. M. Herstein and T. C. Gregory, published 1935, by D. Van Nostrand Co. Inc., New York, pages 178 to 187.